US012358303B2

(12) United States Patent
Ono

(10) Patent No.: US 12,358,303 B2
(45) Date of Patent: Jul. 15, 2025

(54) DUPLEX PRINTER

(71) Applicant: DAI NIPPON PRINTING CO., LTD., Tokyo (JP)

(72) Inventor: Katsuhisa Ono, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 95 days.

(21) Appl. No.: 18/253,433

(22) PCT Filed: Feb. 21, 2022

(86) PCT No.: PCT/JP2022/007044
§ 371 (c)(1),
(2) Date: May 18, 2023

(87) PCT Pub. No.: WO2022/177015
PCT Pub. Date: Aug. 25, 2022

(65) Prior Publication Data

US 2024/0010010 A1 Jan. 11, 2024

(30) Foreign Application Priority Data

Feb. 19, 2021 (JP) ................................ 2021-025342

(51) Int. Cl.
*B41J 3/60* (2006.01)
*B41J 11/70* (2006.01)

(52) U.S. Cl.
CPC *B41J 3/60* (2013.01); *B41J 11/70* (2013.01)

(58) Field of Classification Search
CPC ..... B41J 3/60; B41J 11/70; B41J 11/50; B41J 15/04; B65H 15/00; B65H 29/58
See application file for complete search history.

(56) References Cited

U.S. PATENT DOCUMENTS 9,205,674 B2 12/2015 Kamitani et al.
2003/0161671 A1* 8/2003 Hokiyama ................ B41J 3/60 400/188

(Continued)

FOREIGN PATENT DOCUMENTS

JP 2014-129170 A 7/2014

OTHER PUBLICATIONS

English translation of the International Preliminary Report on Patentability (Chapter I) dated Aug. 31, 2023 (Application No. PCT/JP2022/007044).

(Continued)

*Primary Examiner* — Douglas X Rodriguez
*Assistant Examiner* — Tracey M McMillion
(74) *Attorney, Agent, or Firm* — BURR PATENT LAW, PLLC

(57) ABSTRACT

[Object] To reduce the time required to transport a cut sheet and perform printing at a high speed.

[Solution] A duplex printer 10 includes a printing unit 12A, a cut sheet feeder 25, and a guide transport path 24. A reversing mechanism 20 that reverses a cut sheet 1 returned from the printing unit 12A is connected to the guide transport path 24 via a switcher 61. A stopper 62 that stops the cut sheet 1 is provided in a part of the guide transport path 24 on the upstream side of the switcher 61. A discharge path 65 branches off from the stopper 62 of the guide transport path 24.

16 Claims, 15 Drawing Sheets

(56) References Cited

U.S. PATENT DOCUMENTS

| | | | | |
|---|---|---|---|---|
| 2006/0012663 | A1* | 1/2006 | Im | B41J 13/03 347/210 |
| 2017/0129259 | A1* | 5/2017 | Moriyama | B41J 3/283 |
| 2019/0176496 | A1* | 6/2019 | Nihashi | B65H 5/26 |
| 2019/0258197 | A1* | 8/2019 | Hirata | B65H 29/58 |

OTHER PUBLICATIONS

International Search Report and Written Opinion (Application No. PCT/JP2022/007044) dated May 10, 2022.

* cited by examiner

DUPLEX PRINTER

TECHNICAL FIELD

The present disclosure relates to a printer that performs printing on a cut sheet, and in particular, to a duplex printer that can perform duplex printing on a cut sheet.

BACKGROUND ART

As a printer that performs duplex printing, a duplex printer that transfers dye or pigment to a cut sheet, having receptive layers on both surfaces, through heating of a thermal head is known.

Such a duplex printer includes a printing unit that performs printing on one surface of a cut sheet and a reversing mechanism that reverses the cut sheet on which the printing unit has performed printing. The printing unit further performs printing on the other surface of the cut sheet reversed by the reversing mechanism.

CITATION LIST

Patent Literature

PTL 1: Japanese Unexamined Patent Application Publication No. 2014-129170

SUMMARY OF INVENTION

Technical Problem

Such a duplex printer includes a reversing mechanism that reverses a cut sheet, and it takes a long time to transport the cut sheet.

The present disclosure has been made in consideration of such a point, and an object thereof is to provide a duplex printer that makes the time required to transport a cut sheet as short as possible and performs a printing operation at a high speed as a whole.

Solution to Problem

A duplex printer according to the present disclosure includes a printing unit, a cut sheet feeder that stores a cut sheet on both surfaces of which printing is to be performed and that supplies the cut sheet to the printing unit, and a guide transport path that transports the cut sheet from the cut sheet feeder to the printing unit. A reversing mechanism that reverses the cut sheet returned from the printing unit is switchably connected to the guide transport path via a switcher. The reversing mechanism reverses the cut sheet whose one surface is facing the printing unit so that the other surface of the cut sheet faces the printing unit. A stopper that stops the cut sheet supplied from the cut sheet feeder is provided in a part of the guide transport path on an upstream side of the switcher in a transport direction. A discharge path that discharges the cut sheet returned from the printing unit is connected via a branching portion to a part of the guide transport path on a downstream side of the stopper in the transport direction.

In a duplex printer according to the present disclosure, the branching portion of the discharge path is provided between the stopper and the switcher.

In a duplex printer according to the present disclosure, the stopper also serves as the branching portion of the discharge path.

In a duplex printer according to the present disclosure, the reversing mechanism is disposed directly below the switcher of the guide transport path.

In a duplex printer according to the present disclosure, the reversing mechanism includes a housing shell that has a cylindrical inner peripheral surface and that is disposed so that a center line thereof is oriented in a horizontal direction and a drive mechanism that rotates the housing shell around a rotation shaft extending vertically.

In a duplex printer according to the present disclosure, an upper opening is provided in an upper part the housing shell, and the reversing mechanism has a link path that links the upper opening of the housing shell with the switcher.

In a duplex printer according to the present disclosure, a distance L between the switcher and the stopper has a relationship such that $L1\times5\%\leq L\leq L1\times20\%$ with respect to a length L1 of the cut sheet in the transport direction.

In a duplex printer according to the present disclosure, the housing shell is provided with a plurality of guide rollers that protrude inward in a radial direction from the inner peripheral surface of the housing shell and that guide the cut sheet.

A duplex printer according to the present disclosure further includes a control device. The control device supplies the cut sheet from the cut sheet feeder to the printing unit through the guide transport path and causes the printing unit to perform printing on one surface of the cut sheet, feeds a next cut sheet from the cut sheet feeder to the guide transport path and causes the stopper to stop a leading end of the next cut sheet, feeds the cut sheet from the printing unit through the guide transport path and from the switcher to the reversing mechanism and causes the reversing mechanism to reverse the cut sheet whose one surface is facing the printing unit so that the other surface of the cut sheet faces the printing unit, next feeds the reversed cut sheet to the printing unit and causes the printing unit to perform printing on the other surface of the cut sheet, feeds the cut sheet on which printing has been performed from the printing unit through the guide transport path and from the branching portion to the discharge path, and supplies the next cut sheet that has been stopped by the stopper in the guide transport path to the printing unit.

Advantageous Effects of Invention

As described above, with the present disclosure, the time required to transport a cut sheet is reduced, and a printing operation is performed at a high speed as a whole.

DESCRIPTION OF EMBODIMENTS

Hereafter, embodiments of the present invention will be described with reference to the drawings.

FIGS. 1A to 13B illustrate an embodiment of a duplex printer according to the present invention.

Figure 1A:
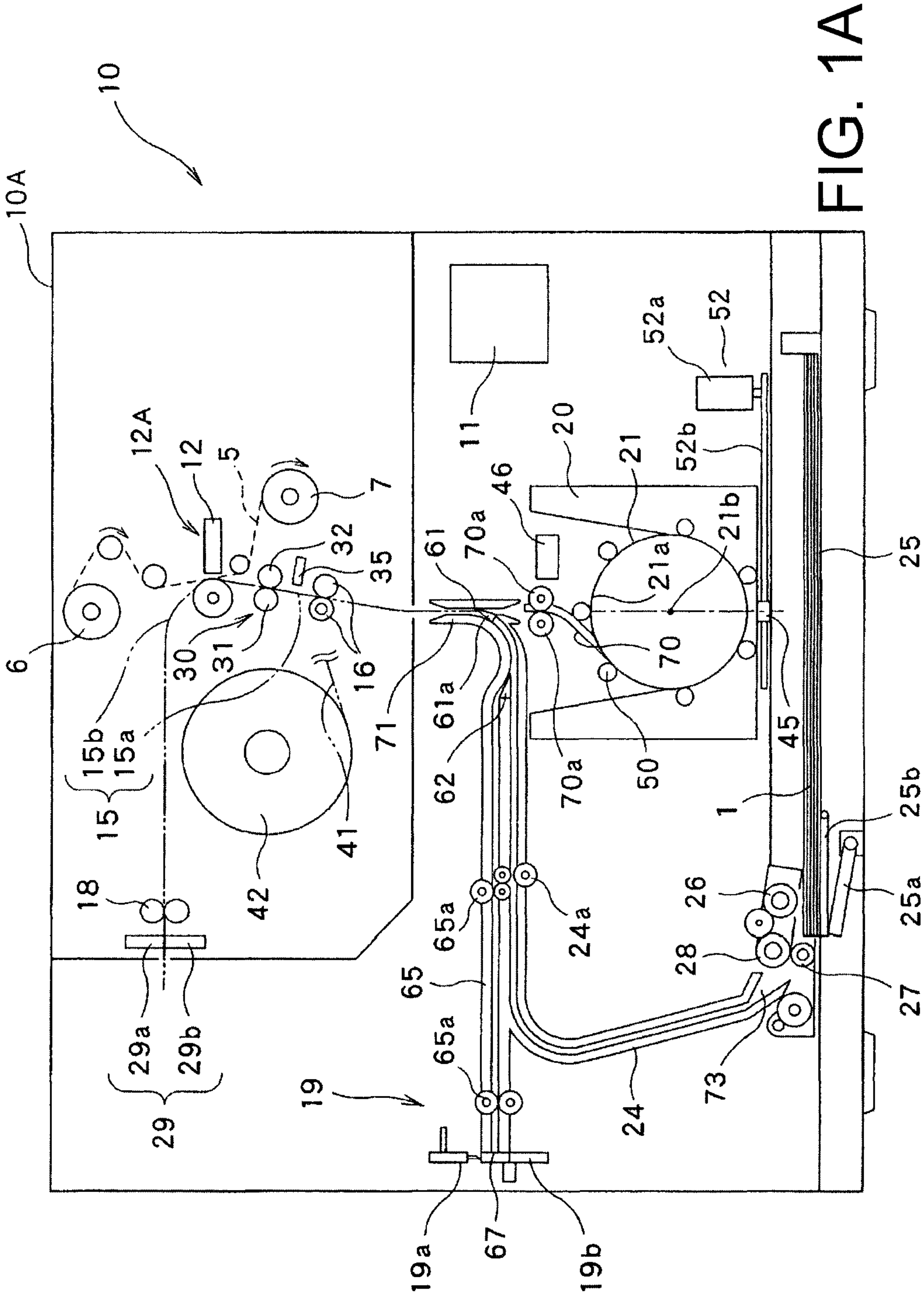
FIG. 1A is a schematic side view of an embodiment of a duplex printer according to the present disclosure.
Figure 1B:
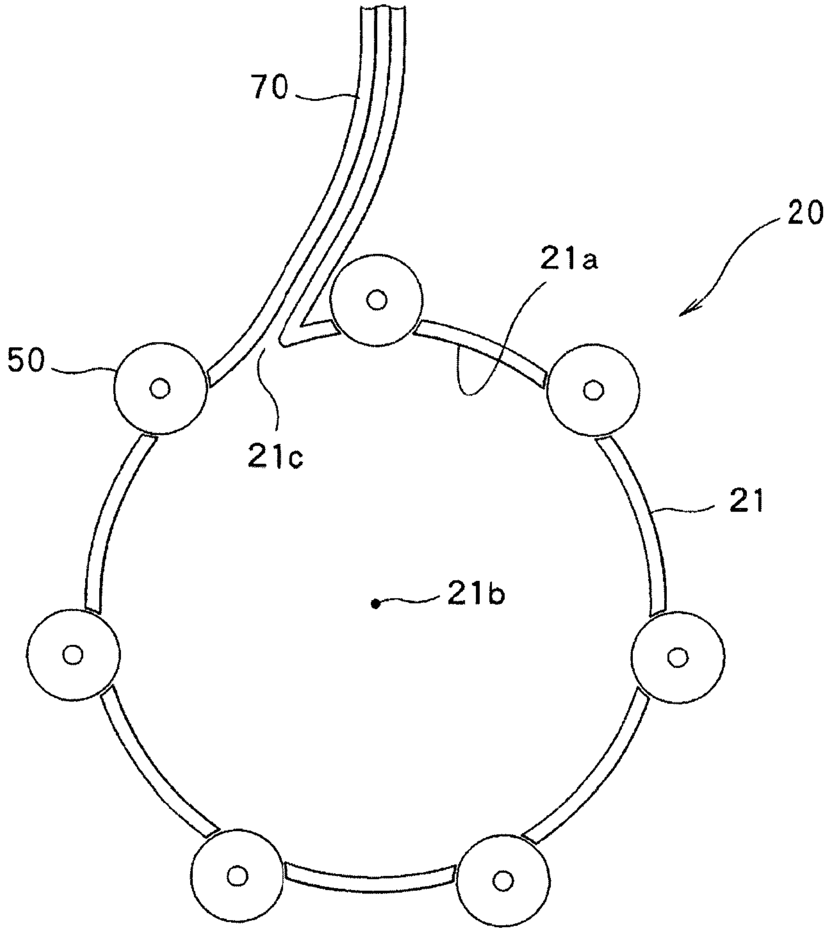
FIG. 1B is an enlarged view of a housing shell of a reversing mechanism.

Among these, FIG. 1A is a schematic side view of an embodiment of a duplex printer according to the present disclosure, FIG. 1B is an enlarged view of a housing shell of a reversing mechanism, and FIGS. 2 to 12 illustrate operations of the duplex printer according to the present disclosure.

As illustrated in FIGS. 1A and 1B, a duplex printer 10 includes a dye sublimation printer that transports a cut sheet 1, having receptive layers on both surfaces, and performs duplex printing on the cut sheet 1 by using a printing unit 12A including a thermal head 12. The duplex printer 10 can also transport a continuous sheet 41, having a receptive layer at least on one surface, and perform simplex printing on the continuous sheet 41 by using the printing unit 12A including the thermal head 12.

The duplex printer 10 includes a housing 10A, the printing unit 12A that is provided in the housing 10A and includes the thermal head 12, and a cut sheet feeder 25. The cut sheet feeder 25 is disposed below the printing unit 12A, stores the cut sheet 1 on which duplex printing is to be performed, and supplies the cut sheet 1 to the thermal head 12. The duplex printer 10 may further include a roll sheet feeder 42 in which the continuous sheet 41, on which simplex printing is to be performed, is rolled and that supplies the rolled continuous sheet 41 to the thermal head 12.

A guide transport path 24 that transports the cut sheet 1 from the cut sheet feeder 25 to the thermal head 12 is set between the thermal head 12 and the cut sheet feeder 25.

The thermal head 12 performs printing on the cut sheet 1, which is supplied to the thermal head 12 from the cut sheet feeder 25 through the guide transport path 24, and then the cut sheet 1 is returned to the guide transport path 24.

A reversing mechanism 20 that reverses the cut sheet 1 returned from the thermal head 12 is switchably connected to the guide transport path 24 via a switcher 61.

The switcher 61, which is provided in the guide transport path 24, is provided in the vicinity of an outlet 71 of the guide transport path 24 that feeds the cut sheet 1 to the thermal head 12. The switcher 61 includes a switching flap 61*a* for feeding the cut sheet 1, which has been returned from the thermal head 12, toward the reversing mechanism 20.

A stopper 62 that stops the cut sheet 1 supplied from the cut sheet feeder 25 is provided in a part of the guide transport path 24 on the upstream side of the switcher 61 in the transport direction of the cut sheet 1. The stopper 62 stops the cut sheet 1 by engaging with one end portion 1A of the cut sheet 1 supplied from the guide transport path 24.

In the present description, the terms "upstream side" and "downstream side" refer to "upstream side" and "downstream side" in the transport direction in which the cut sheet 1 is transported from the cut sheet feeder 25 toward the thermal head 12.

The terms "above" and "below" refer to "above" and "below" when the duplex printer is disposed as illustrated in FIG. 1A.

The stopper 62, which is provided in the guide transport path 24, has a flap-like shape and can switch between transport paths. A discharge path 65 that branches off from a part of the guide transport path 24 where the stopper 62 is located and discharges the cut sheet 1 outward is provided in the guide transport path 24. The stopper 62 is switchable between: a function of stopping the cut sheet 1, which is supplied from the cut sheet feeder 25, and feeding the cut sheet 1, which has been returned from the thermal head 12, toward the discharge path 65; and a function of feeding the cut sheet 1, which is supplied from the cut sheet feeder 25, toward the thermal head 12 without stopping the cut sheet 1, and closing the discharge path 65. In this way, the stopper 62 not only stops the cut sheet 1 but also serves as a branching portion that diverts the cut sheet, which has been returned from the thermal head 12, toward the discharge path 65. In the example described here, the stopper 62 not only stops the cut sheet 1 but also serves as a branching portion that diverts the cut sheet, which has been returned from the thermal head 12, toward the discharge path 65. However, this is not a limitation. The discharge path 65 may branch off from a part of the guide transport path 24 further on the downstream side of the switcher 61 via a branching portion.

A plurality of nip rollers 65*a*, which nip and feed the cut sheet 1 toward an outlet 67 of the discharge path 65, are provided in the discharge path 65. Moreover, a cutter 19, which cuts the cut sheet 1 as described below, is provided at the outlet 67 of the discharge path 65.

In the present embodiment, an example in which the discharge path 65 branches off from a part of the guide transport path 24 where the stopper 62 is located has been described. However, this is not a limitation. The discharge path 65 can be configured to branch off from any part of the guide transport path 24 between the stopper 62 and the switcher 61.

Next, referring to FIGS. 1A and 1B, the reversing mechanism 20 will be described. The reversing mechanism 20 reverses the cut sheet 1, which has been returned from the thermal head 12 toward the guide transport path 24 and whose one surface 1*a* is facing the thermal head 12, so that the other surface 1*b* of the cut sheet 1 faces the thermal head 12.

The guide transport path 24 and the reversing mechanism are disposed below the roll sheet feeder 42, the cut sheet feeder 25 is provided below the guide transport path 24 and the reversing mechanism 20, and the duplex printer 10 has a compact structure as a whole. In this case, in particular, the reversing mechanism 20 is disposed directly below the switcher 61, which is provided in the vicinity of the outlet 71 of the guide transport path 24.

Among the components described above, existing components can be used as the roll sheet feeder 42 and the thermal head 12. The guide transport path 24, the reversing mechanism 20, and the cut sheet feeder 25 are disposed below the existing roll sheet feeder 42. Thus, the duplex printer according to the present invention is configured at low cost by using the existing roll sheet feeder 42 and the existing thermal head 12.

A one-side sheet transport path 15*a* is provided on the inlet side of the thermal head 12, an other-side sheet transport path 15*b* is provided on the outlet side of the thermal head 12, and the one-side sheet transport path 15*a* and the other-side sheet transport path 15*b* constitute a sheet transport path 15.

A platen roller 13 for holding the cut sheet 1 or the continuous sheet 41 is provided at a position that faces the thermal head 12 with the cut sheet 1 or the continuous sheet 41 therebetween.

Moreover, the guide transport path 24 is connected to the one-side sheet transport path 15*a* of the sheet transport path 15 via the outlet 71. The reversing mechanism 20 is connected to the guide transport path 24 via the switcher 61.

A pickup lever 25*a* is provided in the cut sheet feeder 25. The pickup lever 25*a* raises leading end portions of cut sheets 1 placed on a lifting/lowering plate 25*b* in the cut sheet feeder 25. A pickup roller 26 feeds an uppermost cut sheet 1, which is the uppermost one of the cut sheets 1 raised by the pickup lever 25*a*, toward the guide transport path 24.

That is, a separation roller 27 and a feed roller 28 are provided on the side of an inlet 73 of the guide transport path 24. The pickup roller 26 feeds the uppermost cut sheet 1, which is the uppermost one of the cut sheets 1 raised by the pickup lever 25*a*, toward the separation roller 27 and the feed roller 28. At this time, it is conceivable that a cut sheet 1 below the uppermost cut sheet 1 might be fed toward the separation roller 27 and the feed roller 28 together with the uppermost cut sheet 1. In this case, because the cut sheet 1 below the uppermost cut sheet 1 comes into contact with the separation roller 27, the cut sheet 1 is not fed toward the guide transport path 24.

In the one-side sheet transport path 15*a* of the sheet transport path 15, a transport roller 16 and a sheet transport mechanism 30 are provided in this order from the side of the guide transport path 24. An end portion sensor 35 for detecting an end portion 1B of the cut sheet 1 is set between the sheet transport mechanism 30 and the transport roller 16. In this case, the sheet transport mechanism 30 is composed of a friction roller 31 and a pinch roller 32.

Moreover, a discharge roller 18 is provided on the outlet side of the other-side sheet transport path 15*b*, and a cutter 29 for cutting the continuous sheet 41 is set further toward the outlet side of the discharge roller 18.

The cutter 29 removes a margin of a leading end portion and a margin of a trailing end portion of the continuous sheet 41 on which printing has been performed. The cutter 29 is composed of a fixed edge 29*b* and a movable edge 29*a* that cuts the continuous sheet 41 at a position between the fixed edge 29*b* and the movable edge 29*a*.

On the other hand, as described above, the cutter 19 for cutting the cut sheet 1 is set at the outlet 67 of the discharge path 65 that discharges the cut sheet 1 on which printing has been performed. The cutter 19 removes a margin of a leading end portion and a margin of a trailing end portion of the cut sheet 1 on which printing has been performed. The cutter 19 is composed of a fixed edge 19*b* and a movable edge 19*a* that cuts the cut sheet 1 at a position between the fixed edge 19*b* and the movable edge 19*a*.

Furthermore, a dye-sublimation-transfer ribbon 5 that performs dye sublimation transfer is supplied from a ribbon unwinder 6 to the thermal head 12 of the printing unit 12A. The ribbon 5 supplied from the ribbon unwinder 6 is used by the thermal head 12 when performing dye-sublimation-transfer printing. Subsequently, the used ribbon 5 is wound by a ribbon winder 7.

Next, referring to FIGS. 1A and 1B, the reversing mechanism 20 that reverses the cut sheet 1 whose one surface 1*a* is facing the thermal head 12 so that the other surface 1*b* faces the thermal head 12 will be described further.

The reversing mechanism 20 is connected to the side of the outlet 71 of the guide transport path 24 via the switcher 61.

As illustrated in FIGS. 1A and 1B, the reversing mechanism 20 includes a housing shell 21 that has a cylindrical inner peripheral surface 21*a* and that is disposed so that a center line 21*b* is oriented in a horizontal direction and a drive mechanism 52 that rotates the housing shell 21 around a rotation shaft 45 extending vertically. Among these, the housing shell 21 is rotatable around the rotation shaft 45, and the housing shell 21 is rotated by the drive mechanism 52. The drive mechanism 52 is composed of a drive motor 52*a* and a transmission mechanism 52*b* that transmits rotational movement from the drive motor 52*a* to the rotation shaft 45.

As described above, the housing shell 21 has the cylindrical inner peripheral surface 21*a*, and an upper opening 21*c*, which introduces the cut sheet 1 into the housing shell 21, is provided in an upper part the housing shell 21. The reversing mechanism 20 has a link path 70 that links the upper opening 21*c* of the housing shell 21 with the switcher 61 of the guide transport path 24.

Guide rollers 50 provided in the housing shell 21 move the cut sheet 1, which has been introduced into the housing shell 21, along the cylindrical inner peripheral surface 21*a*. Moreover, the housing shell 21 is provided with a position detection sensor 46 that detects the position of the cut sheet 1 that moves along the inner peripheral surface 21*a*.

Next, referring to FIG. 1B, the housing shell 21 and the guide rollers 50 will be described. The plurality of guide rollers 50 are provided on the outer periphery of the housing shell 21. The guide rollers 50 extend through the housing shell 21 and slightly protrude further inward in the radial direction from the inner peripheral surface 21*a* of the housing shell 21. The guide rollers 50 come into contact with the cut sheet 1 that enters into the housing shell 21 and guide the cut sheet 1 along the inner peripheral surface 21*a* of the housing shell 21.

In this case, although the leading end portion (the other end portion) 1B of the cut sheet 1 that enters into the housing shell 21 comes into contact with the inner peripheral surface 21*a* of the housing shell 21, the other portions of the cut sheet 1 are guided by the guide rollers 50. Therefore, the cut sheet 1 that enters into the housing shell 21 is not damaged by being rubbed against the inner peripheral surface 21*a* of the housing shell 21.

A control device 11 controls driving of all of the components described above, such as the drive motor 52*a* of the drive mechanism 52, the guide rollers 50, the sheet transport mechanism 30, the roll sheet feeder 42, the thermal head 12, the ribbon unwinder 6, the ribbon winder 7, the transport roller 16, the discharge roller 18, the cutter 19, the cutter 29, the pickup lever 25*a*, the pickup roller 26, the separation roller 27, and the feed roller 28. All of these components and the control device 11 are accommodated in the housing 10A.

The control device 11 includes a transport-mechanism drive controller that enables the thermal head 12 to perform multicolor printing with high precision by controlling driving of the sheet transport mechanism 30 with high precision.

Next, the sheet transport mechanism 30, which transports the cut sheet 1, and the end portion sensor 35 will be described.

As illustrated in FIG. 1A, the sheet transport mechanism 30, which transports the cut sheet 1, and the end portion sensor 35 are set in this order from the side of the thermal head 12 in the one-side sheet transport path 15*a* of the sheet transport path 15 and between the thermal head 12 and the transport roller 16.

Among these, the sheet transport mechanism 30 includes the friction roller 31 and the pinch roller 32 that presses the cut sheet 1 against the friction roller 31.

The end portion sensor 35 is provided adjacent to the side of the transport roller 16 of the sheet transport mechanism 30, and the end portion sensor 35 can detect the end portion 1B of the cut sheet 1. A detection signal from the end portion sensor 35 is sent to the transport-mechanism drive controller in the control device 11. The drive controller enables the thermal head 12 to perform multicolor printing with high precision by controlling driving of the friction roller 31 based on the signal from the end portion sensor 35 to adjust the position of the end portion 1B of the cut sheet 1.

Next, referring to FIGS. 1A to 12, operations of the present embodiment having such a configuration will be described.

First, as illustrated in FIG. 1A, an operation with which the thermal head 12 performs simplex printing on the continuous sheet 41 wound around the roll sheet feeder 42 will be described.

First, the continuous sheet 41 is unwound from the roll sheet feeder 42, and the continuous sheet 41 is fed from the sheet transport path 15 toward the discharge roller 18.

Next, the thermal head 12 performs dye-sublimation-transfer printing on one surface of the continuous sheet 41.

That is, the continuous sheet 41, which has been discharged outward from the discharge roller 18, is transported by the roll sheet feeder 42 and the discharge roller 18 in the opposite direction toward the sheet transport path 15, and the continuous sheet 41 is returned toward the roll sheet feeder 42. The dye-sublimation-transfer ribbon 5 is supplied from the ribbon unwinder 6 toward the thermal head 12, and dye or pigment of the ribbon 5 can be transferred to the one surface of the continuous sheet 41 due to heat from the thermal head 12.

The dye-sublimation-transfer ribbon 5 has a Y (yellow) region, an M (magenta) region, a C (cyan) region, and an OP (overcoat) region. First, Y printing is performed by using the Y region of the ribbon 5.

In this way, the thermal head 12 performs Y printing on the one surface of the continuous sheet 41 by using the dye-sublimation-transfer ribbon 5. The continuous sheet 41, on which Y printing has been performed, is fed from the sheet transport path 15 toward the discharge roller 18 again.

Subsequently, in the same way as described above, while the continuous sheet 41 is being returned toward the roll sheet feeder 42, the thermal head 12 successively performs M printing and C printing on the one surface of the continuous sheet 41 by using the dye-sublimation-transfer ribbon 5, thereby finishing multicolor printing. Subsequently, an overcoat layer is formed on the one surface of the continuous sheet 41.

The continuous sheet 41, on which printing has been performed on the one surface in this way, is fed from the other-side sheet transport path 15*b* of the sheet transport path 15 toward the discharge roller 18. Next, the cutter 29 removes a margin of a leading end portion of the continuous sheet 41 on which printing was not performed.

The discharge roller 18 discharges the continuous sheet 41 further outward, and then the cutter 29 removes a margin of a trailing end portion of the continuous sheet 41.

In this way, the continuous sheet 41, on the one surface of which printing has been performed and the margin of the leading end portion and the margin of the trailing end portion have been removed, is discharged outward by the discharge roller 18 and taken out as a product.

Next, referring to FIGS. 2 to 13B, an operation with which the thermal head 12 performs duplex printing on the cut sheet 1 stored in the cut sheet feeder 25 will be described.

Figure 2:
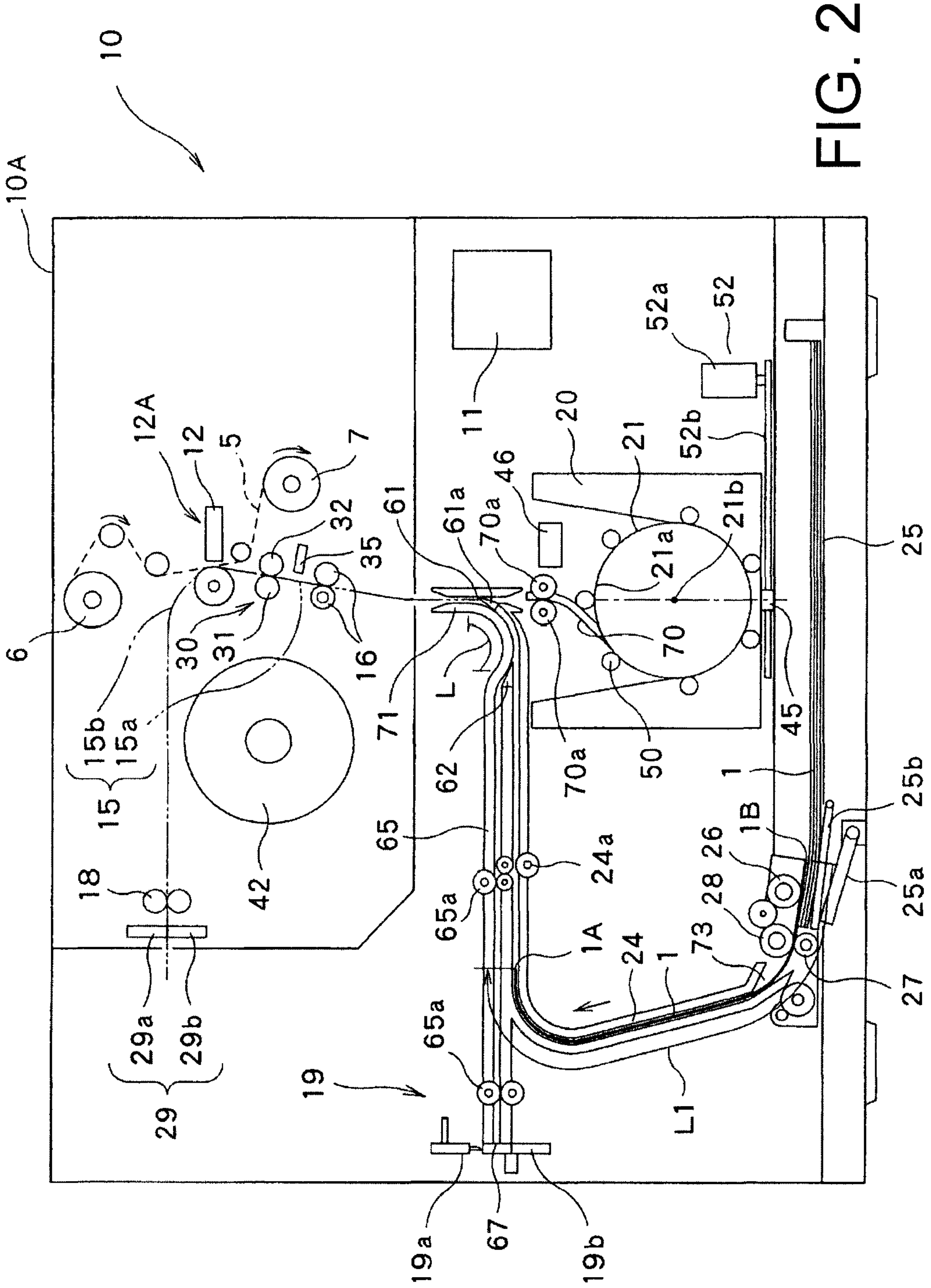
FIG. 2 illustrates an operation of the duplex printer according to the present disclosure.

First, as illustrated in FIG. 2, multiple cut sheets 1 are stacked in the cut sheet feeder 25.

From this state, the pickup lever 25*a* raises the lifting/lowering plate 25*b* in the cut sheet feeder 25. At this time, leading end portions of the cut sheets 1 placed on the lifting/lowering plate 25*b* are also raised.

Subsequently, the pickup roller 26 feeds an uppermost cut sheet 1, which is the uppermost one of the cut sheets 1 placed on the lifting/lowering plate 25*b*, toward the separation roller 27 and the feed roller 28.

At this time, the transport roller 16 on the side of the one-side sheet transport path 15*a* rotates in synchronism with the pickup roller 26, the separation roller 27, and the feed roller 28.

Next, as illustrated in FIG. 2, the cut sheet 1, which has been fed by the pickup roller 26 toward the separation roller 27 and the feed roller 28, is subsequently fed through the guide transport path 24 toward the sheet transport path 15 with the one end portion 1A as the leading end. When the uppermost cut sheet 1 of the cut sheets 1 in the cut sheet feeder 25 is being transported, it is conceivable that another cut sheet 1 below the uppermost cut sheet 1 might be also fed toward the separation roller 27 and the feed roller 28. However, because the one end portion 1A of the other cut sheet 1 below the uppermost cut sheet 1 comes into contact with the separation roller 27, only the uppermost cut sheet 1 is fed from the guide transport path 24 toward the sheet transport path 15 (see FIG. 3).

In this case, the pickup lever 25*a* descends at the same time as a sensor (not shown) provided in the guide transport path 24 detects the other end portion 1B of the cut sheet 1. Along with this, the lifting/lowering plate 25*b* in the cut sheet feeder 25 and the cut sheets 1 on the lifting/lowering plate 25*b* also descend.

In the meantime, particularly in the transport mechanism 30, the pinch roller 32 presses the cut sheet 1 against the friction roller 31. Therefore, as the drive controller of the control device 11 drives the friction roller 31, the cut sheet 1 can be reliably transported by a frictional force from the friction roller 31. Since the cut sheet 1 is transported by the frictional force from the friction roller 31, for example, the cut sheet 1 is not damaged compared with a case where small projections are provided on the transport roller and the projections engage with the cut sheet 1.

As described below, when the cut sheet 1 passes through the transport mechanism 30, both surfaces of the cut sheet 1 come into contact with the friction roller 31 of the transport mechanism 30. However, since the friction roller 31 transports the cut sheet 1 by using a frictional force, the friction roller 31 does not damage both surfaces of the cut sheet 1. Moreover, duplex printing can be appropriately performed on both surfaces of the cut sheet 1.

Subsequently, the cut sheet 1 is fed from the sheet transport path 15 toward the discharge roller 18.

At this time, the pickup roller 26, the separation roller 27, and the feed roller 28 each stop.

Next, the thermal head 12 performs dye-sublimation-transfer printing on the one surface 1*a* of the cut sheet 1.

Figure 4:
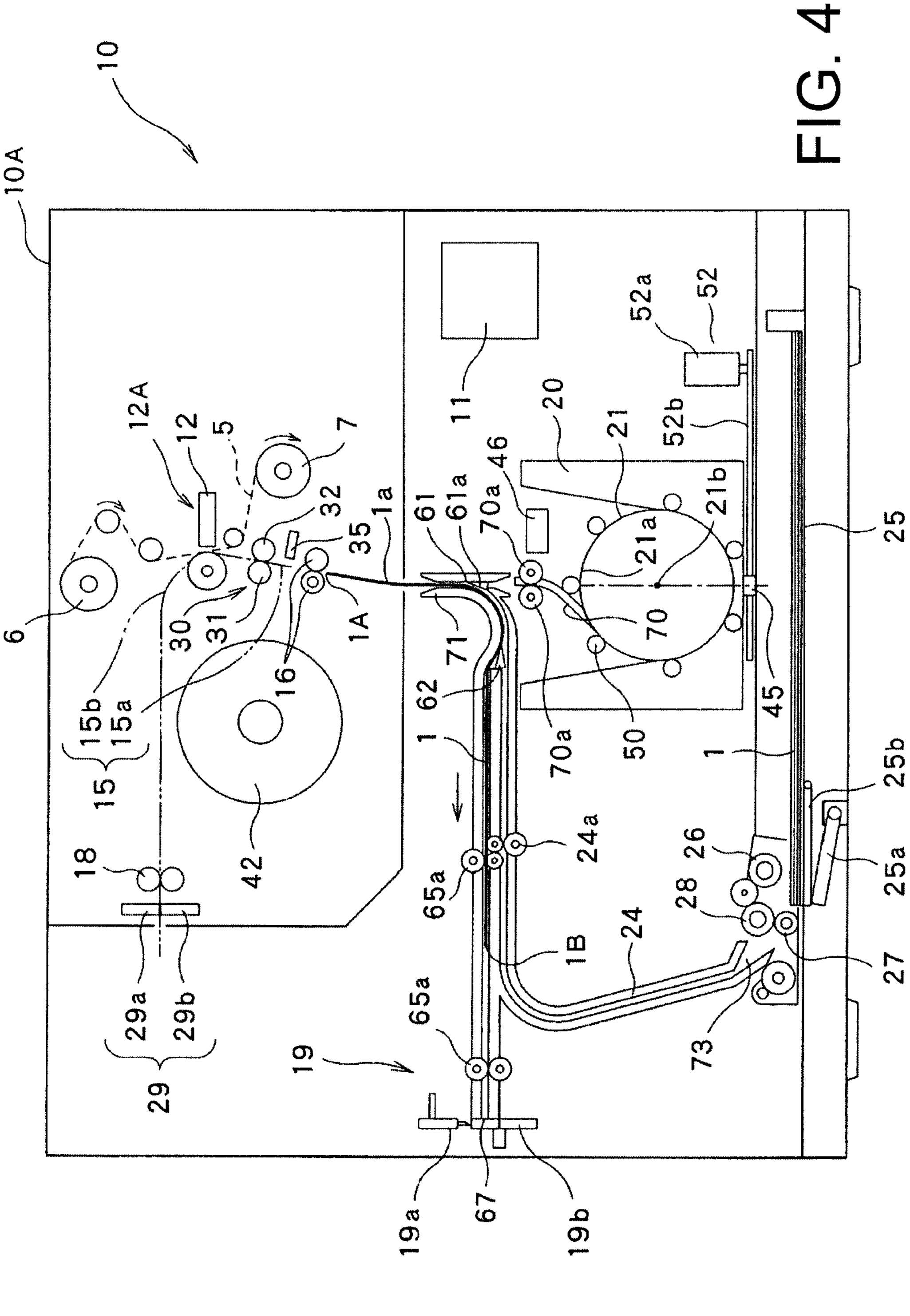
FIG. 4 illustrates an operation of the duplex printer according to the present disclosure.

In this case, first, as illustrated in FIG. 4, the discharge roller 18 transports the cut sheet 1, which has been discharged outward from the discharge roller 18, in the opposite direction toward the sheet transport path 15. The transport roller 16 and the transport mechanism 30 transport the cut sheet 1 from the other-side sheet transport path 15*b* of the sheet transport path 15 toward the one-side sheet transport path 15*a*. The ribbon unwinder 6 supplies the dye-sublimation-transfer ribbon 5 toward the thermal head 12. Due to the heat of the thermal head 12, dye or pigment on the side of the ribbon 5 can be transferred to the one surface 1*a* of the cut sheet 1. In the meantime, the stopper 62 of the guide transport path 24 guides the cut sheet 1, which is returned from the thermal head 12, toward the discharge path 65. In this case, the stopper 62 has been switched to a position for stopping the cut sheet 1 supplied from the cut sheet feeder 25.

The dye-sublimation-transfer ribbon 5 has a Y (yellow) region, an M (magenta) region, a C (cyan) region, and an OP (overcoat) region. First, Y printing is performed by using the Y region of the dye-sublimation-transfer ribbon 5.

That is, first, the thermal head 12 performs Y printing on the one surface 1*a* of the cut sheet 1 by using the dye-sublimation-transfer ribbon 5. The cut sheet 1, on which Y printing has been performed, is returned from the thermal head 12 toward the one-side sheet transport path 15*a* of the sheet transport path 15. Subsequently, the cut sheet 1 enters the guide transport path 24 and is fed toward the discharge path 65 through the switcher 61 as the stopper 62 switches the transport path.

Figure 5:
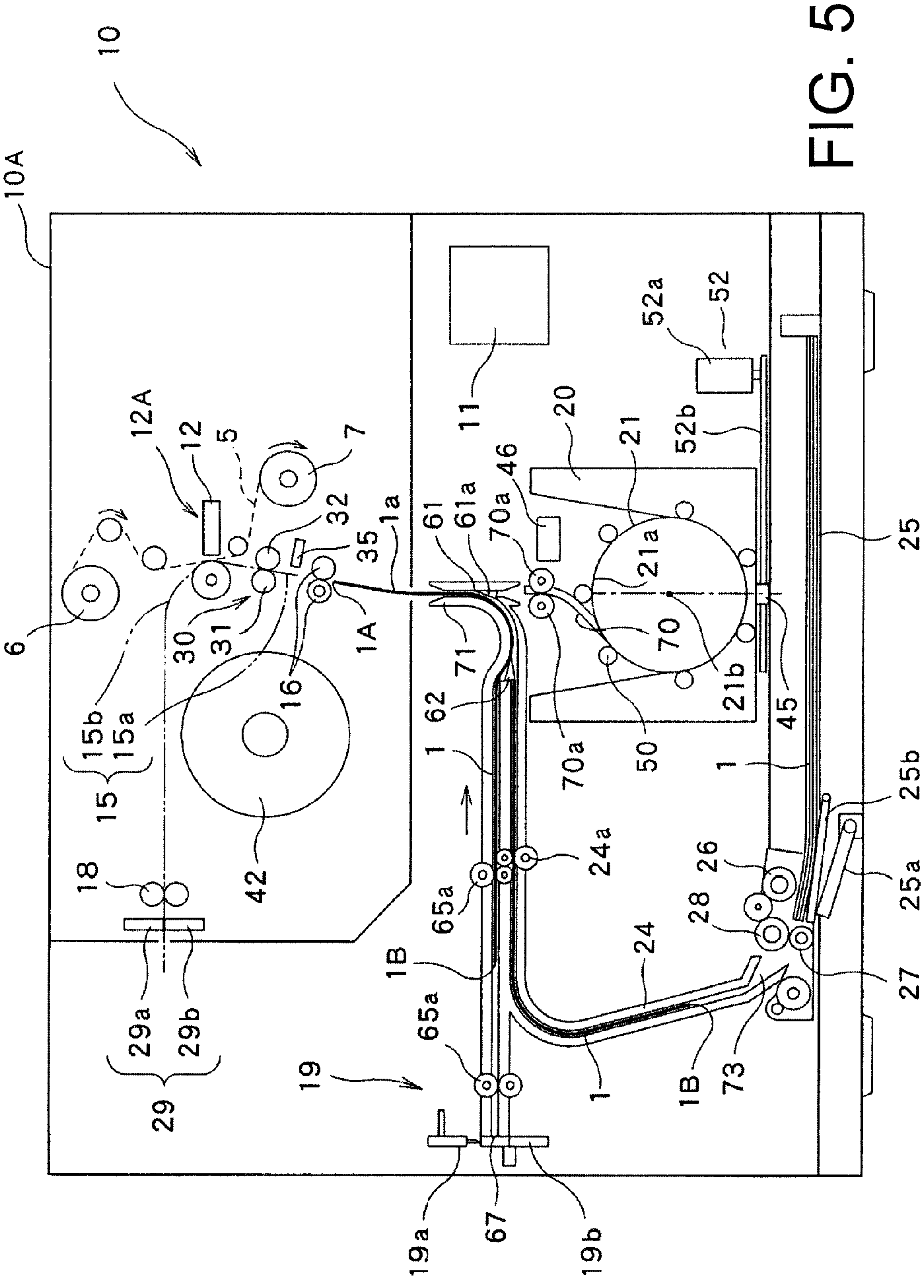
FIG. 5 illustrates an operation of the duplex printer according to the present disclosure.

Next, as illustrated in FIG. 5, the cut sheet 1 in the discharge path 65 enters the guide transport path 24 via the stopper 62, passes through the switcher 61, and is fed from the one-side sheet transport path 15*a* of the sheet transport path 15 toward the other-side sheet transport path 15*b* again. Subsequently, in the same way as described above, the cut sheet 1 is returned from the other-side sheet transport path 15*b* toward the one-side transport path 15*a*. In the meantime, the thermal head 12 successively performs M printing and C printing on the one surface 1*a* of the cut sheet 1 by using the dye-sublimation-transfer ribbon 5, thereby finishing multicolor printing. Subsequently, an overcoat layer is formed on the one surface 1*a* of the cut sheet 1.

In this way, the cut sheet 1, which has been fed toward the discharge roller 18, is returned by the transport mechanism 30 from the other-side sheet transport path 15*b* toward the one-side sheet transport path 15*a*. The cut sheet 1 enters the guide transport path 24 and is fed toward the discharge path 65 through the switcher 61 as the stopper 62 switches the transport path. In the meantime, the thermal head 12 successively performs Y printing, M printing, and C printing on the one surface 1*a* of the cut sheet 1, and an overcoat layer is formed on the one surface 1*a*.

When the cut sheet 1 is returned by the transport mechanism 30 from the other-side sheet transport path 15*b* toward the one-side sheet transport path 15*a*, the other end portion 1B of the cut sheet 1 at the leading end is detected by the end portion sensor 35, and a detection signal from the end portion sensor 35 is sent to the transport-mechanism drive controller of the control device 11. Then, the drive controller controls driving of the friction roller 31 based on the signal from the end portion sensor 35, and thus the position of the other end portion 1B of the cut sheet 1 can be adjusted.

That is, while the transport mechanism 30 is transporting the cut sheet 1, it is conceivable that slight slipping may occur between the friction roller 31 and the cut sheet 1 and slight misalignment may occur between the friction roller 31 and the cut sheet 1.

In this case, the drive controller of the control device 11 can adjust the position of the other end portion 1B of the cut sheet 1 at the leading end by controlling driving of the friction roller 31 based on a signal from the end portion sensor 35. The drive controller of the control device 11 performs such adjustment of the position of the cut sheet 1 every time when performing printing of each color (Y printing, M printing, and C printing) and when forming an overcoat layer. Therefore, it is possible to reliably adjust the position of the cut sheet 1 and to realize high-precision multicolor printing by using the thermal head 12.

In this way, the thermal head 12 performs dye-sublimation-transfer printing on the one surface 1*a* of the cut sheet 1, and multicolor printing on the one surface 1*a* of the cut sheet 1 finishes.

In the meantime, as illustrated in FIG. 5, the cut sheet feeder 25 supplies the next cut sheet 1 into the guide transport path 24.

In this case, in the same way as described above, the pickup lever 25*a* raises the lifting/lowering plate 25*b* in the cut sheet feeder 25 to raise the cut sheets 1 stacked in the cut sheet feeder 25. Subsequently, the pickup roller 26 feeds the next cut sheet 1, which is the second uppermost one of the cut sheets 1 placed on the lifting/lowering plate 25*b*, toward the separation roller 27 and the feed roller 28. Next, the next cut sheet 1, which has been fed by the pickup roller 26 toward the separation roller 27 and the feed roller 28, is subsequently fed into the guide transport path 24 with the one end portion 1A of the next cut sheet 1 being the leading end. Next, the stopper 62 engages with the one end portion 1A in the guide transport path 24 to stop the next cut sheet 1.

In this way, while printing is being performed on the cut sheet 1, the next cut sheet 1 is on standby in the guide transport path 24.

In this case, it is convenient that the distance between the switcher 61, which is provided in the guide transport path 24, and the stopper 62 be as short as possible. It is possible to supply the next cut sheet 1 toward the thermal head 12 rapidly by reducing the distance between the switcher 61 and the stopper 62 in this way.

Figure 3:
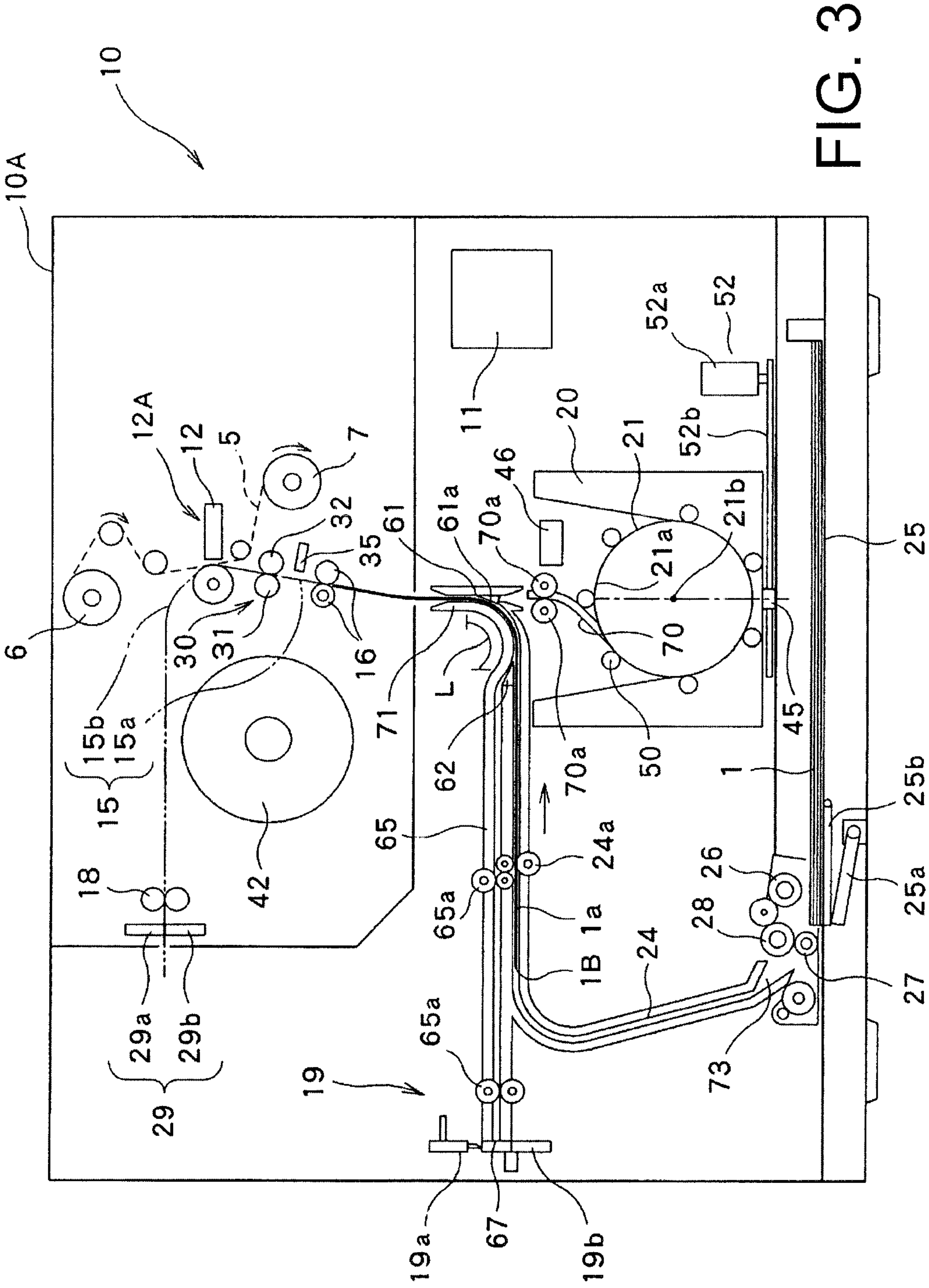
FIG. 3 illustrates an operation of the duplex printer according to the present disclosure.

In the present embodiment, the distance L between the switcher 61 and the stopper 62 has a relationship such that $L1\times5\%\leq L\leq L1\times20\%$ with respect to the length L1 of the cut sheet 1 in the transport direction (see FIGS. 2 and 3).

In this case, if L is shorter than $L1\times5\%$, the switcher 61 and the stopper 62 are so close to each other that it is difficult to set the switcher 61 and the stopper 62 independently. On the other hand, if L is longer than $L1\times20\%$, it takes a long time to supply the next cut sheet 1, which has been stopped by the stopper 62, toward the thermal head 12.

In the meantime, the pickup lever 25*a* descends at the same time as a sensor (not shown) provided in the guide transport path 24 detects the other end portion 1B of the cut sheet 1. Along with this, the lifting/lowering plate 25*b* in the cut sheet feeder 25 and the cut sheets 1 on the lifting/lowering plate 25*b* also descend.

Figure 6:
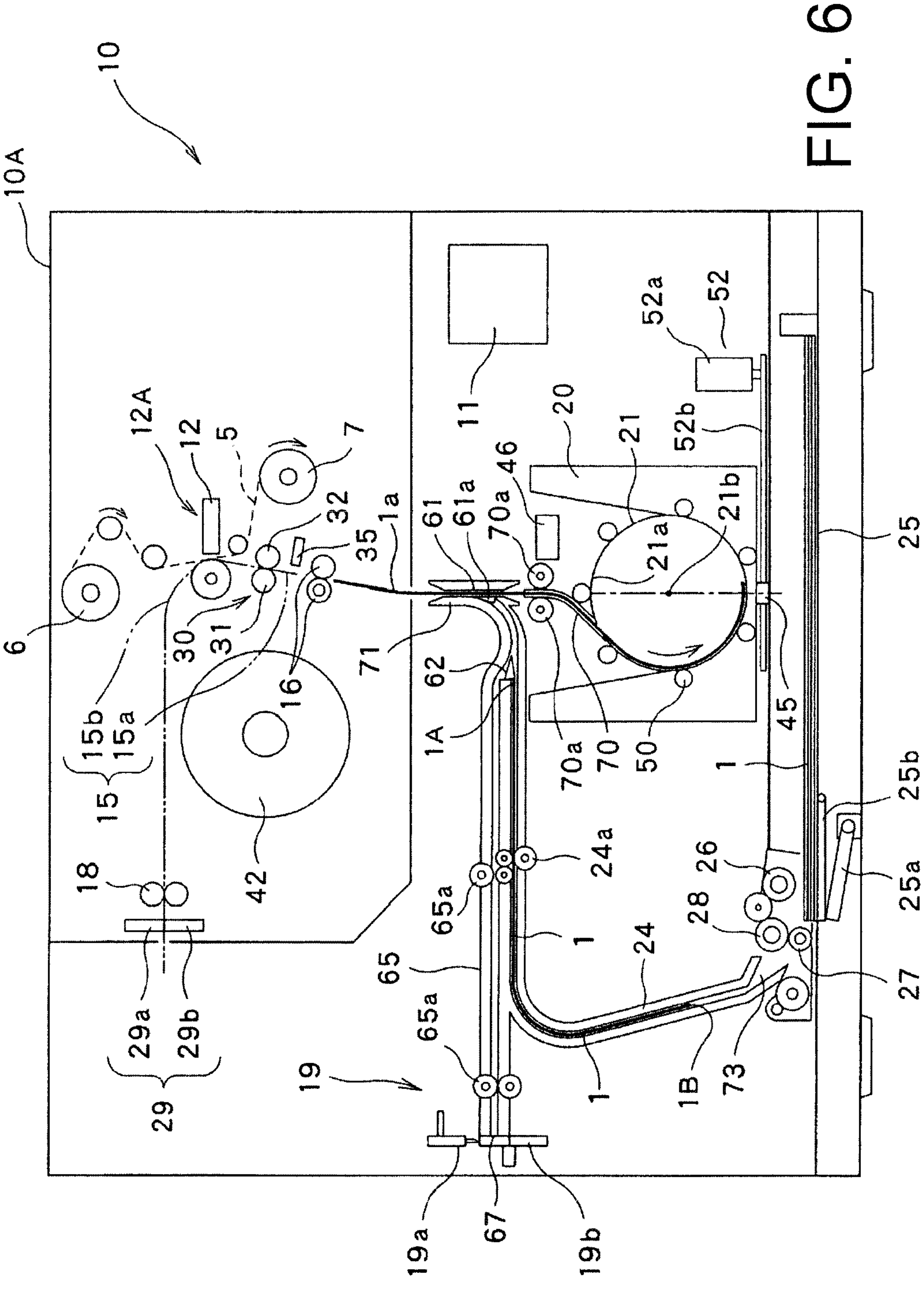
FIG. 6 illustrates an operation of the duplex printer according to the present disclosure.
Figure 8:
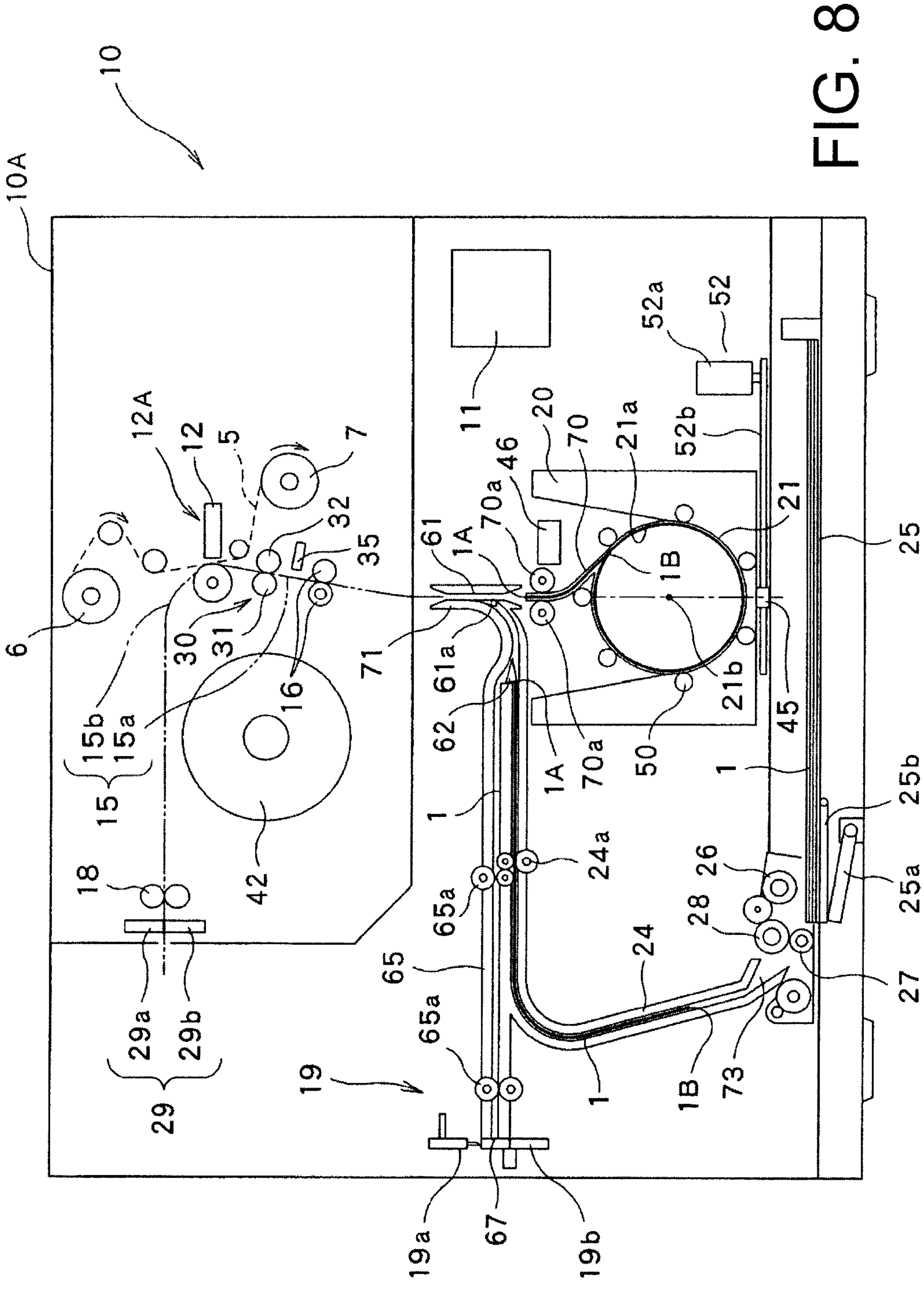
FIG. 8 illustrates an operation of the duplex printer according to the present disclosure.

Subsequently, as illustrated in FIGS. 6 and 8, an operation of reversing the cut sheet 1 is performed in the reversing mechanism 20.

That is, after the thermal head 12 has performed multicolor printing on the one surface 1*a* of the cut sheet 1, the cut sheet 1 is returned from the thermal head 12 toward the guide transport path 24. Next, the switcher 61, which has the switching flap 61*a* provided in the vicinity of the outlet 71 of the guide transport path 24 feeds the cut sheet 1 into the reversing mechanism 20. In this case, the printing has been performed on the one surface 1*a* of the cut sheet 1. At this time, the cut sheet 1 passes through the link path 70 of the reversing mechanism 20 and is introduced into the housing shell 21 from the upper opening 21*c* (see FIGS. 1B and 6).

At this time, the switching flap 61*a* in the guide transport path 24 has been switched beforehand. The switching flap 61*a* can reliably guide the cut sheet 1, which has been returned into the guide transport path 24, into the housing shell 21 from the upper opening 21*c* via the link path 70. In the meantime, a nip roller 70*a* of the link path 70 feeds the cut sheet 1 toward the housing shell 21.

Subsequently, the cut sheet 1, which has been introduced into the housing shell 21 is moved by the guide rollers 50 along the cylindrical inner peripheral surface 21*a* of the housing shell 21 (see FIGS. 1B and 7). In this case, although the leading end portion (the other end portion) 1B of the cut sheet 1 comes into contact with the inner peripheral surface 21*a* of the housing shell 21, the other portions of the cut sheet 1 are guided by the guide rollers 50. Therefore, the cut sheet 1 is not damaged by being rubbed against the inner peripheral surface 21*a* of the housing shell 21.

Figure 7:
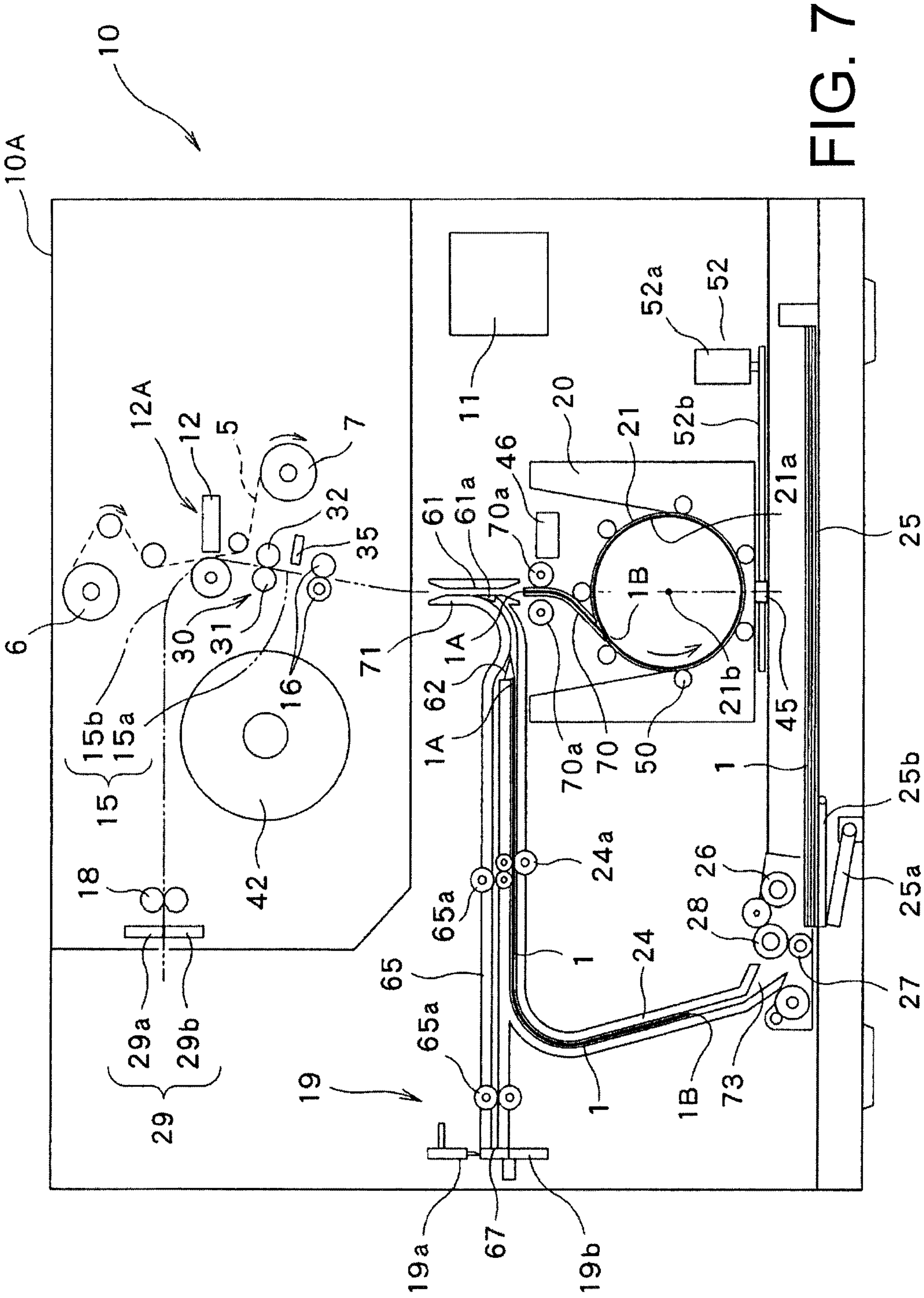
FIG. 7 illustrates an operation of the duplex printer according to the present disclosure.

Subsequently, as illustrated in FIG. 7, the trailing end portion (the one end portion) 1A of the cut sheet 1 is detected by the position detection sensor 46, and the control device 11 stops driving the guide rollers 50 based on a signal from the position detection sensor 46. The position detection sensor 46 is disposed at an end portion of the link path 70 on the side of the switcher 61.

As illustrated in FIG. 7, the cut sheet 1 is disposed along the inner peripheral surface 21*a* of the housing shell 21, the one end portion 1A of the cut sheet 1 is positioned at an end portion of the link path 70 on the side of the switcher 61, and the other end portion 1B of the cut sheet 1 is placed on the inner peripheral surface 21*a* of the housing shell 21.

Next, the control device 11 rotates the drive motor 52*a*, and the housing shell 21 rotates by 180° around the rotation shaft 45 (see FIG. 8).

As the housing shell 21 rotates by 180° around the rotation shaft 45, the position of the cut sheet 1 is changed from one where the one surface 1*a* has been facing toward the thermal head 12 to the other where the other surface 1*b* faces toward the thermal head 12.

In this way, the reversing mechanism 20 finishes the reversing operation of reversing of the cut sheet 1.

Figure 9:
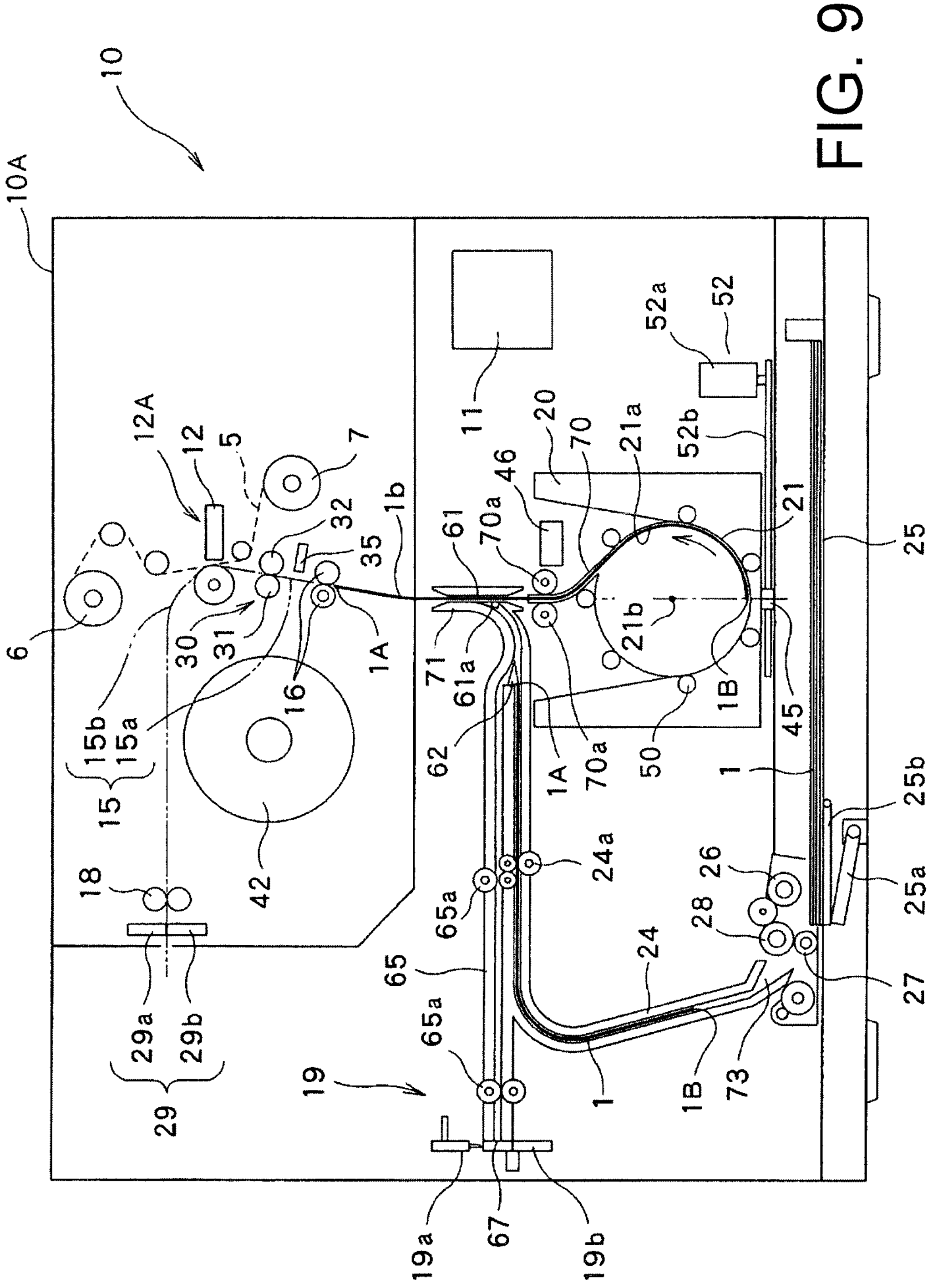
FIG. 9 illustrates an operation of the duplex printer according to the present disclosure.

Next, as illustrated in FIG. 9, the guide rollers 50 in the housing shell 21 are driven again, and the guide rollers 50 feed the cut sheet 1. In this case, the cut sheet 1 which has been disposed along the inner peripheral surface 21*a* of the housing shell 21 is fed toward the thermal head 12 through the link path 70 and the switcher 61 with the end portion 1A being the leading end.

Due to the reversing function of the reversing mechanism 20 described above, it is possible to reverse the cut sheet 1 whose one surface 1*a* is facing the thermal head 12 so that the other surface 1*b* faces the thermal head 12. When the cut sheet 1 is introduced into the housing shell 21, the other end portion 1B becomes the leading end. When the cut sheet 1 is subsequently fed out from the housing shell 21, the other end portion 1B becomes the trailing end.

Therefore, both before and after the cut sheet 1 is reversed, the other end portion 1B is oriented toward the housing shell 21.

Subsequently, the cut sheet 1 is fed from the guide transport path 24 toward the discharge roller 18 (see FIG. 9).

Figure 10:
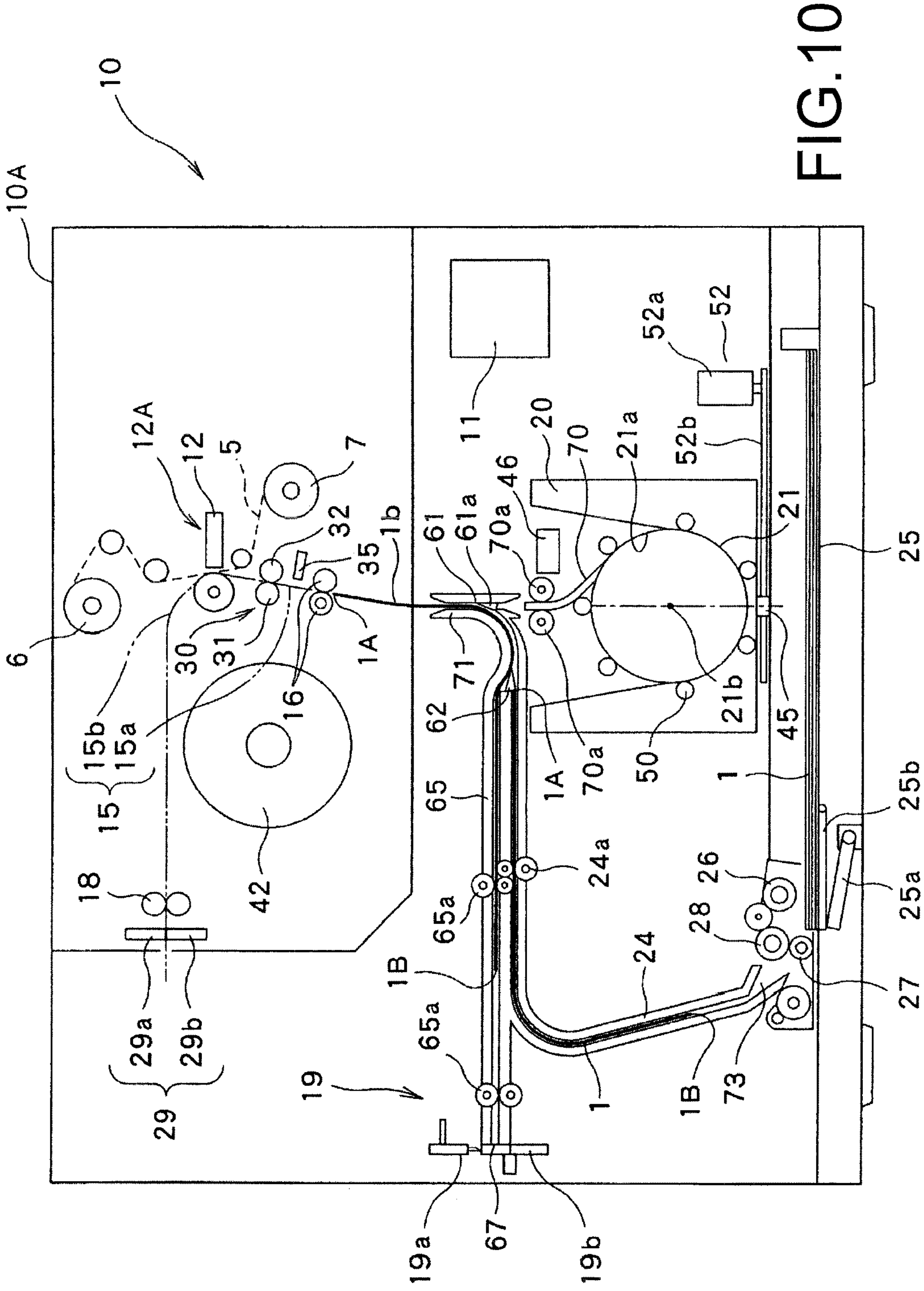
FIG. 10 illustrates an operation of the duplex printer according to the present disclosure.

Subsequently, as illustrated in FIG. 10, in the same way as describe above, the thermal head 12 performs firstly Y printing on the other surface 1*b* of the cut sheet 1 by using the dye-sublimation-transfer ribbon 5. At this time, the cut sheet 1, which has been returned from the thermal head 12 to the guide transport path 24, is fed toward the discharge path 65 through the switcher 61 as the stopper 62 switches the transport path.

Subsequently, M printing and C printing are successively performed on the other surface 1*b* of the cut sheet 1 by using the dye-sublimation-transfer ribbon 5. Subsequently, an overcoat layer is formed on the other surface 1*b* of the cut sheet 1. In this way, multicolor printing on the other surface 1*b* of the cut sheet 1 finishes.

Next, the cut sheet 1, on both surfaces 1*a* and 1*b* of which duplex printing has been performed, is returned from the thermal head 12 toward the guide transport path 24, and is fed toward the discharge path 65 via the switcher 61 and the stopper 62, which are provided in the guide transport path 24.

Figure 11:
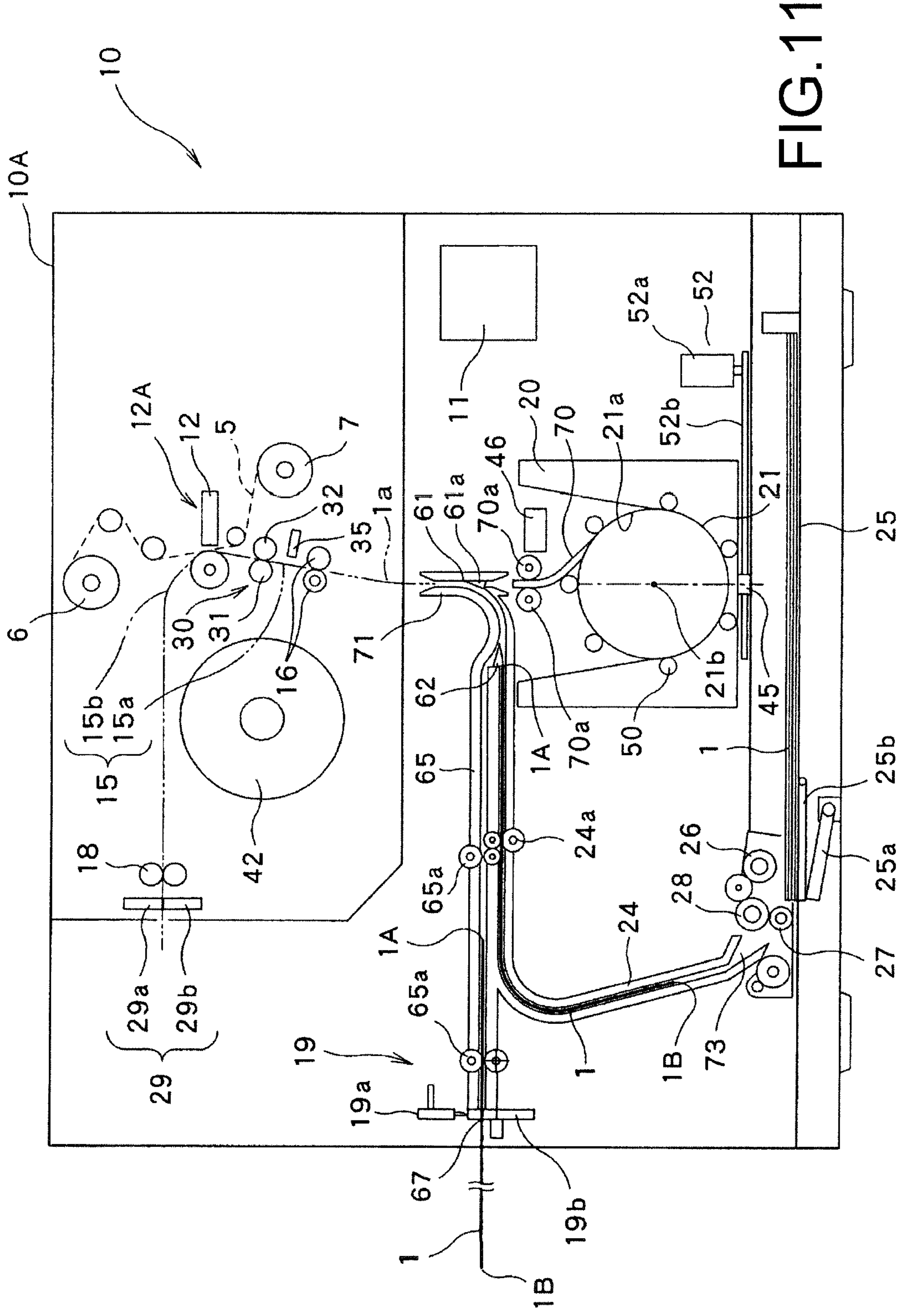
FIG. 11 illustrates an operation of the duplex printer according to the present disclosure.

Next, a margin of the leading end portion (the other end portion) 1B of the cut sheet 1 on which printing was not performed is removed by the cutter 19 (see FIG. 11).

The cut sheet 1 is discharged further outward from a discharge path 65, and next a margin of the trailing end portion (the one end portion) 1A of the cut sheet 1 is removed by the cutter 19.

In this way, the cutting is performed on both of the one surface 1*a* and the other surface 1*b* of the cut sheet 1 and the margin of the leading end portion and the margin of the trailing end portion are removed. Then the cut sheet 1 is discharged outward from the cutter 19 and taken out as a product.

In the meantime, the drive mechanism 52 rotates the housing shell 21 by 180° around the rotation shaft 45 again, and the housing shell 21 assumes the original position.

Both before and after the cut sheet 1 is reversed, the other end portion 1B of the cut sheet 1 is oriented toward the housing shell 21. Therefore, when the printing is performed on the cut sheet 1 while feeding the cut sheet from the discharge roller 18 toward the thermal head 12, the other end portion 1B is always firstly introduced into the thermal head 12, and printing is performed on the cut sheet 1 by the thermal head 12. Thus, when the cutter 19 removes a margin of the one end portion 1A and a margin of the other end portion 1B on which printing was not performed, it is possible to reduce the length of the margin.

Figure 13A:
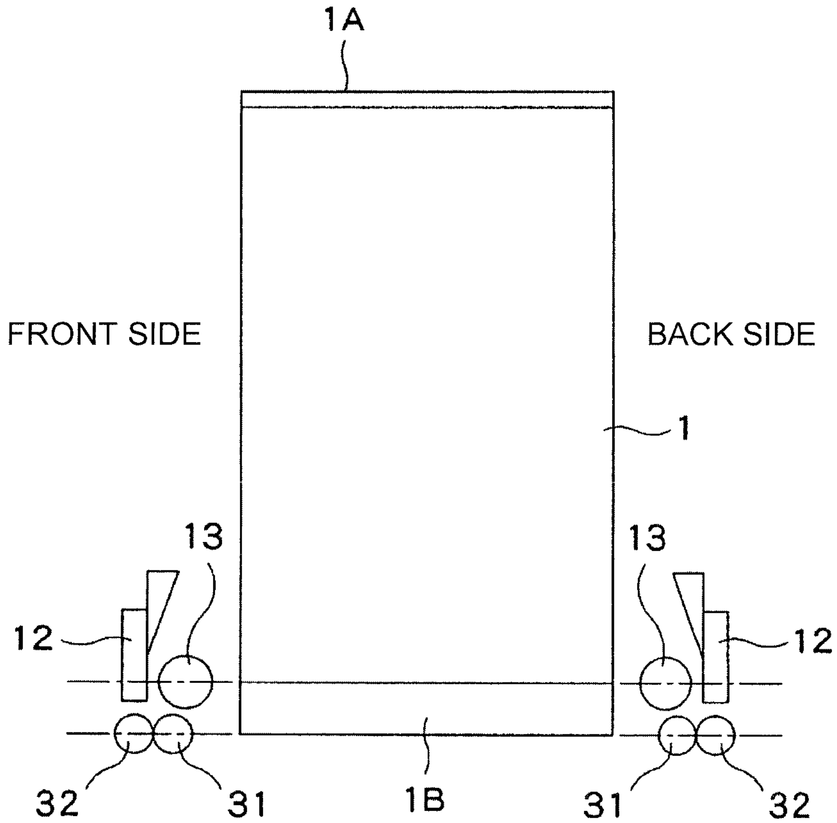
FIG. 13A illustrates a cut sheet on which duplex printing according to the present disclosure has been performed.
Figure 13B:
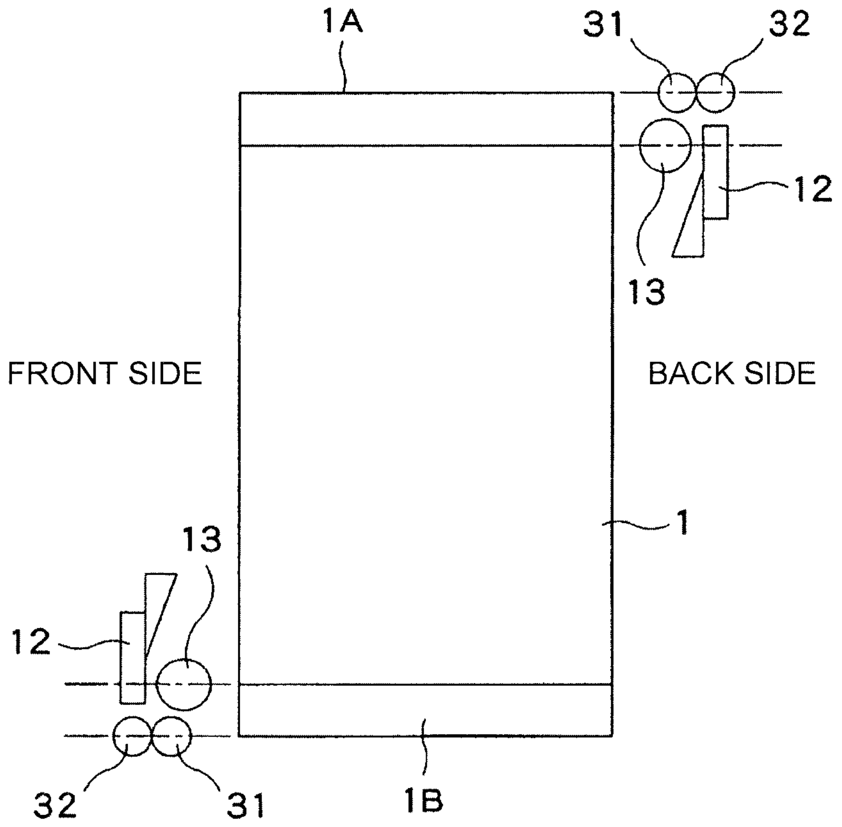
FIG. 13B illustrates a cut sheet on which duplex printing according to a comparative example has been performed.

That is, as illustrated in FIG. 13A, with the present embodiment, both before and after the reversion of the cut sheet, the cut sheet 1 is always fed toward the thermal head 12, while the other end portion 1B firstly coming toward the thermal head 12, and the thermal head 12 performs printing on the one surface 1*a* and on the other surface 1*b*.

When the thermal head 12 performs printing on the cut sheet 1, it is necessary to remove, as a margin, a region of the cut sheet 1 between the friction roller 31/the pinch roller 32 and the thermal head 12.

With the present embodiment, the cut sheet 1 is always introduced into the thermal head 12 from the discharge roller 18 while the other end portion 1B firstly coming toward the thermal head 12, both before and after being reversed, and printing is performed on the cut sheet 1. Therefore, the region between the friction roller 31/the pinch roller 32 and the thermal head 12 to be removed as a margin can be disposed on the side of the other end portion 1B in both of cases where the region is on the front side (the one surface

1*a*) of the cut sheet 1 and where the region is on the back side (the other surface 1*b*) of the cut sheet 1.

Therefore, it is possible to reliably remove a predetermined margin of the cut sheet 1 by removing the margin of the cut sheet 1 on the side of the other end portion 1B by using the cutter 19. Although it is also necessary to remove a margin of the cut sheet 1 on the side of the one end portion 1A, the margin on the side of the one end portion 1A is optional and can be formed shorter than the margin on the side of the other end portion 1B.

On the other hand, suppose a comparative example (see FIG. 13B), before the cut sheet 1 is reversed, the cut sheet 1 is introduced into the thermal head 12, while the other end portion 1B firstly coming toward the thermal head 12 and printing is performed on the cut sheet 1; and, after the cut sheet 1 is reversed, the cut sheet 1 is introduced into the thermal head 12, while the one end portion 1A coming toward the thermal head 12, and printing is performed on the cut sheet 1. In this case, the region of the cut sheet 1 between the friction roller 31/the pinch roller 32 and the thermal head 12 to be removed as a margin exists both on the side of the one end portion 1A (the front side) and on the side of the other end portion 1B (the back side) of the cut sheet 1. Therefore, the length of the margin to be removed by the cutter 19 is large.

In contrast, with the present embodiment, the region of the cut sheet 1 between the friction roller 31/the pinch roller 32 and the thermal head 12 to be removed as a margin can be always brought to the side of the other end portion 1B of the cut sheet 1, and it is possible to reduce the length of the margin to be removed.

Figure 12:
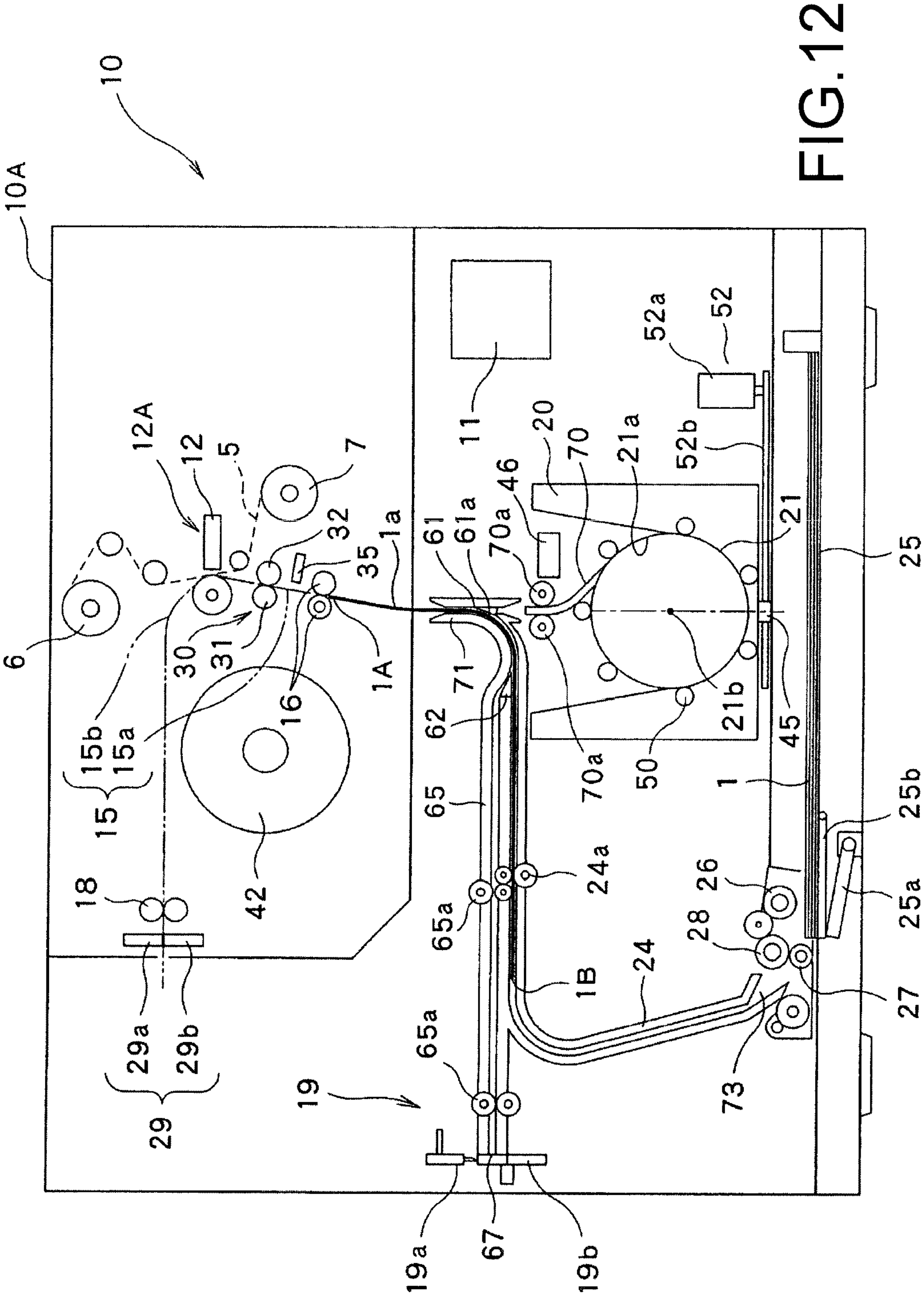
FIG. 12 illustrates an operation of the duplex printer according to the present disclosure.

Next, as illustrated in FIG. 12, the stopper 62 of the guide transport path 24 is switched to the open position, and the next cut sheet 1, which has been on standby by being stopped by the stopper 62, is fed toward the thermal head 12 through the switcher 61. Then, duplex printing is performed on the next cut sheet 1.

As heretofore described, with the present embodiment, the reversing mechanism 20 is connected via the switcher 61, which is provided in the vicinity of the outlet 71 on the side of the thermal head 12 of the guide transport path 24 that transports the cut sheet 1 supplied from the cut sheet feeder 25. In this case, the reversing mechanism 20 is disposed directly below the switcher 61 of the guide transport path 24. Therefore, the cut sheet 1 returned from the thermal head 12 can be supplied directly from the switcher 61 to the reversing mechanism 20, and the transport path length of the cut sheet 1 from the thermal head 12 to the reversing mechanism 20 can be made as short as possible. Thus, it is possible to make the time required to transport the cut sheet 1 as short as possible and to increase the speed of a printer operation.

The housing shell 21 of the reversing mechanism 20 has the upper opening 21*c*, and the housing shell 21 is directly connected to the switcher 61 of the guide transport path 24 via the upper opening 21*c* and the link path 70. Therefore, it is possible to considerably reduce the time required to introduce the cut sheet 1 into the housing shell 21 from the switcher 61 of the guide transport path 24 via the link path 70 and the time required to feed the cut sheet 1 in the housing shell 21 to the switcher 61 of the guide transport path 24 via the link path 70.

With the present embodiment, the cut sheet 1 supplied from the cut sheet feeder 25 is fed from the guide transport path 24 toward the thermal head 12, duplex printing is performed on the cut sheet 1, and the cut sheet 1 is discharged outward from the discharge path 65 from the guide transport path 24 via the switcher 61 and the stopper 62. In the meantime, the next cut sheet 1 is supplied from the cut sheet feeder 25 to the guide transport path 24, and the next cut sheet 1 is supplied to the stopper 62 provided in the vicinity of the switcher 61, and the stopper 62 makes the next cut sheet 1 be on standby. Therefore, immediately after discharging the cut sheet 1, on which duplex printing has been performed by the thermal head 12, outward from the discharge path 65, it is possible to supply the next cut sheet 1, which has been stopped by the stopper 62, from the guide transport path 24 toward the thermal head 12. Therefore, it is possible to supply the next cut sheet 1 toward the thermal head 12 and perform duplex printing on the next cut sheet 1 without spending unnecessary time after discharging the cut sheet, on which duplex printing has been performed by the thermal head 12, outward from the discharge path 65. Moreover, it is possible to considerably reduce the time required to supply the next cut sheet 1 toward the thermal head 12.

Furthermore, while printing is performed on the cut sheet 1 by the thermal head 12, the cut sheet 1 returned from the thermal head 12 passes through the switcher 61 of the guide transport path 24 and is fed from the stopper 62 toward the discharge path 65. Therefore, the cut sheet 1, on which printing by the thermal head 12 has finished, can be discharged from the discharge path 65 as it is, and it is possible to considerably reduce the time required to discharge the cut sheet 1 after printing has finished.

With the present embodiment, it is possible to more easily perform dye-sublimation-transfer printing by using the thermal head 12 on one surface of the continuous sheet 41 unrolled from the roll sheet feeder 42.

With the present embodiment, it is possible to reverse the orientation of the cut sheet 1 easily and reliably by only introducing the cut sheet 1 into the housing shell 21 of the reversing mechanism 20 and rotating the housing shell 21 by 180°. Moreover, it is possible to more easily perform dye-sublimation-transfer printing by using the thermal head 12 on both surfaces 1*a* and 1*b* of the cut sheet 1 reversed in this way.

It is possible to configure the shape of the duplex printer 10 as a whole compactly, because the guide transport path 24, the reversing mechanism 20, and the cut sheet feeder 25 are disposed below the roll sheet feeder 42. Thus, the simplex and duplex printer 10 has a compact configuration as a whole. Therefore, for example, even if the cut sheet 1 becomes jammed, by opening the housing 10A, it is possible to easily check the position of the cut sheet 1 in the housing 10A and to remove the cut sheet 1.

Furthermore, it is possible to produce the duplex printer 10 easily and at low cost by only using the existing roll sheet feeder 42 and the existing thermal head 12 and setting the guide transport path 24, the cut sheet feeder 25, and the reversing mechanism 20 below the roll sheet feeder 42.

Moreover, the other end portion 1B of the cut sheet 1 is detected by using the end portion sensor 35, and the drive controller of the control device 11 controls driving of the friction roller 31 based on a detection signal from the end portion sensor 35. Therefore, it is possible to adjust the position of the cut sheet 1 by using the friction roller 31 and to perform high-precision multicolor printing by using the thermal head 12.

It is possible to bring a region to be removed as a margin on the side of the other end portion 1B in both cases of the one surface 1*a* and the other surface 1*b* of the cut sheet 1, and it is possible to reduce the length of the margin to be removed.

REFERENCE SIGNS LIST

1 cut sheet
1*a* one surface
1*b* the other surface
5 dye-sublimation-transfer ribbon
6 ribbon unwinder
7 ribbon winder
10 duplex printer
10A housing
11 control device
12 thermal head
13 platen roller
15 sheet transport path
15*a* one-side sheet transport path
15*b* other-side sheet transport path
16 transport roller
18 discharge roller
19 cutter
20 reversing mechanism
21 housing shell
21*a* inner peripheral surface
24 guide transport path
25 cut sheet feeder
25*a* pickup lever
26 pickup roller
27 separation roller
28 feed roller
29 cutter
30 transport mechanism
31 friction roller
32 pinch roller
41 continuous sheet
42 roll sheet feeder
45 rotation shaft
46 position detection sensor
50 guide roller
52 drive mechanism
52*a* drive motor
52*b* transmission mechanism
61 switcher
61*a* switching flap
62 stopper
65 discharge path
67 outlet
70 link path
71 outlet

The invention claimed is:

1. A duplex printer comprising:
a printing unit;
a cut sheet feeder that stores a cut sheet on both surfaces of which printing is to be performed and that supplies the cut sheet to the printing unit; and
a guide transport path that transports the cut sheet from the cut sheet feeder to the printing unit,
wherein a reversing mechanism that reverses the cut sheet returned from the printing unit is switchably connected to the guide transport path via a switcher, and the reversing mechanism reverses the cut sheet whose one surface is facing the printing unit so that the other surface of the cut sheet faces the printing unit,
wherein a stopper that stops the cut sheet supplied from the cut sheet feeder is provided in a part of the guide transport path on an upstream side of the switcher in a transport direction, and a discharge path that discharges the cut sheet returned from the printing unit is connected via a branching portion to a part of the guide transport path on a downstream side of the stopper in the transport direction, and
wherein the reversing mechanism is disposed directly below the switcher of the guide transport path.

2. The duplex printer according to claim 1, wherein the branching portion of the discharge path is provided between the stopper and the switcher.

3. The duplex printer according to claim 2, wherein the reversing mechanism includes a housing shell that has a cylindrical inner peripheral surface and that is disposed so that a center line thereof is oriented in a horizontal direction and a drive mechanism that rotates the housing shell around a rotation shaft extending vertically.

4. The duplex printer according to claim 2, wherein a distance L between the switcher and the stopper has a relationship such that L1×5%≤L≤L1×20% with respect to a length L1 of the cut sheet in the transport direction.

5. The duplex printer according to claim 1, wherein the stopper also serves as the branching portion of the discharge path.

6. The duplex printer according to claim 5, wherein the reversing mechanism includes a housing shell that has a cylindrical inner peripheral surface and that is disposed so that a center line thereof is oriented in a horizontal direction and a drive mechanism that rotates the housing shell around a rotation shaft extending vertically.

7. The duplex printer according to claim 5, wherein a distance L between the switcher and the stopper has a relationship such that L1×5%≤L≤L1×20% with respect to a length L1 of the cut sheet in the transport direction.

8. The duplex printer according to claim 1, wherein the reversing mechanism includes a housing shell that has a cylindrical inner peripheral surface and that is disposed so that a center line thereof is oriented in a horizontal direction and a drive mechanism that rotates the housing shell around a rotation shaft extending vertically.

9. The duplex printer according to claim 8, wherein an upper opening is provided in an upper part the housing shell, and the reversing mechanism has a link path that links the upper opening of the housing shell with the switcher.

10. The duplex printer according to claim 9, wherein a distance L between the switcher and the stopper has a relationship such that L1×5%≤L≤L1×20% with respect to a length L1 of the cut sheet in the transport direction.

11. The duplex printer according to claim 8, wherein the housing shell is provided with a plurality of guide rollers that protrude inward in a radial direction from the inner peripheral surface of the housing shell and that guide the cut sheet.

12. The duplex printer according to claim 8, wherein a distance L between the switcher and the stopper has a relationship such that L1×5%≤L≤L1×20% with respect to a length L1 of the cut sheet in the transport direction.

13. The duplex printer according to claim 1, wherein a distance L between the switcher and the stopper has a relationship such that L1×5%≤L≤L1×20% with respect to a length L1 of the cut sheet in the transport direction.

14. The duplex printer according to claim 1, further comprising:
a control device, wherein
the control device supplies the cut sheet from the cut sheet feeder to the printing unit through the guide transport path and causes the printing unit to perform printing on one surface of the cut sheet,
feeds a next cut sheet from the cut sheet feeder to the guide transport path and causes the stopper to stop a leading end of the next cut sheet, feeds the cut sheet from the printing unit through the guide transport path and from the switcher to the reversing mechanism and causes the reversing mechanism to reverse the cut sheet whose one surface is facing the printing unit so that the other surface of the cut sheet faces the printing unit, next feeds the reversed cut sheet to the printing unit and causes the printing unit to perform printing on the other surface of the cut sheet, feeds the cut sheet on which printing has been performed from the printing unit through the guide transport path and from the branching portion to the discharge path, and supplies the next cut sheet that has been stopped by the stopper in the guide transport path to the printing unit.

15. The duplex printer according to claim 1, wherein the reversing mechanism includes a housing shell that has a cylindrical inner peripheral surface and that is disposed so that a center line thereof is oriented in a horizontal direction and a drive mechanism that rotates the housing shell around a rotation shaft extending vertically.

16. The duplex printer according to claim 1, wherein a distance L between the switcher and the stopper has a relationship such that $L1 \times 5\% \leq L \leq L1 \times 20\%$ with respect to a length L1 of the cut sheet in the transport direction.

* * * * *